United States Patent
Kates et al.

(10) Patent No.: US 8,127,227 B1
(45) Date of Patent: Feb. 28, 2012

(54) COMPUTERIZED METHOD FOR DYNAMIC CONTENT PLACEMENT IN A DOCUMENT

(75) Inventors: Jesse M. Kates, Kansas City, MO (US); Jennifer A. Fridy, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1256 days.

(21) Appl. No.: 11/585,053

(22) Filed: Oct. 23, 2006

(51) Int. Cl.
G06F 17/22 (2006.01)
G06F 17/24 (2006.01)

(52) U.S. Cl. .......................................................... 715/243

(58) Field of Classification Search .................. 715/273, 715/243
See application file for complete search history.

(56) References Cited

U.S. PATENT DOCUMENTS

| | | | | |
|---|---|---|---|---|
| 5,845,303 | A * | 12/1998 | Templeman | 715/255 |
| 6,473,794 | B1 * | 10/2002 | Guheen et al. | 709/223 |
| 7,761,791 | B2 * | 7/2010 | Kobashi et al. | 715/253 |
| 7,770,109 | B2 * | 8/2010 | Fortes | 715/246 |
| 2002/0010666 | A1 * | 1/2002 | Wright | 705/34 |
| 2004/0194028 | A1 * | 9/2004 | O'Brien | 715/517 |
| 2005/0094206 | A1 * | 5/2005 | Tonisson | 358/1.18 |
| 2005/0097438 | A1 * | 5/2005 | Jacobson | 715/500.1 |
| 2005/0172221 | A1 * | 8/2005 | Kobashi et al. | 715/513 |
| 2006/0107204 | A1 * | 5/2006 | Epstein | 715/517 |
| 2007/0089053 | A1 * | 4/2007 | Uhlig et al. | 715/513 |
| 2008/0071929 | A1 * | 3/2008 | Motte et al. | 709/246 |
| 2010/0088585 | A1 * | 4/2010 | Piersol | 715/222 |

OTHER PUBLICATIONS

Purvis et al. "Creating Personalized Documents: An Optimization Approach",2003, ACM, pp. 68-77.*
Schrier et al.,"Adaptive Layout for Dynamically Aggregated Documents", ACM, 2008, pp. 99-108.*

* cited by examiner

Primary Examiner — Doug Hutton, Jr.
Assistant Examiner — James Debrow (57) ABSTRACT

A computer-operated method for dynamically laying out content in a document, so as to thereby establish a resulting document. A computer first virtually lays out primary content portions in a virtual document space within computer memory. The computer then lays out secondary content portions in spatial correlation with associated primary content portions, to the extent space permits. And the computer then lays out tertiary content portions in spatial correlation with areas of the document, such as groups of primary content portions, to the extent space permits, while giving layout preference to tertiary content portions that have higher priority than already-placed secondary content portions. The invention can be used to dynamically generate invoices for telecommunication subscribers or in other scenarios.

18 Claims, 7 Drawing Sheets

| Sprint | Customer | Account Number | Bill Period | Bill Date | 5 of 12 |
|---|---|---|---|---|---|
| | Whitney Smithee | 0077133025-1 | Feb 11 - Feb 28 | Mar 1, 2006 | |

Charges

| (913) 559-2163 | |
|---|---|
| Fair & Flexible Plan - 800 Anytime Minutes Included | $70.00 |
| Overage: 105 Additional Anytime Minutes | $10.00 |
| 13 Directory Assistance Calls @ $1.25/call | $16.25 |
| America option - Roaming calls billed as normal calls | $5.00 |
| Roadside Rescue | $4.00 |
| Mobile Vision Package | TRIAL |
| | |
| Additional Sprint Charges | $20.71 |
| Government Taxes & Fees | $34.68 |
| Total | $310.14 |

PRIMARY CONTENT

ANCHORED CONTENT

You saved $32.00 this month by choosing Fair & Flexible over a comparable Free & Clear plan.

Your free Vision trial expires on May 13, 2006. After that, you will be charged $15.00 per month, per phone unless you contact Sprint Customer Service to cancel.

ANCHORED CONTENT

| Total Anytime Minutes Used | |
|---|---|
| (913) 559-2163 | 1584 |
| Total | 1584 |

FLOATING CONTENT

| Additional Anytime Minutes | |
|---|---|
| 1-100 | $5.00 |
| 101-200 | 10.00 |
| 201-300 | 15.00 |
| 301-400 | 20.00 |
| 401-500 | 40.00 |
| 501-600 | 60.00 |
| 601-700 | 80.00 |
| 701-800 | 100.00 |
| 801-900 | 120.00 |
| 901-1000 | 140.00 |
| 1001-1100 | 160.00 |
| 1101-1200 | 180.00 |
| >1200 | .05/min |

FLOATING CONTENT

| | | Customer | Account Number | Bill Period | Bill Date | |
|---|---|---|---|---|---|---|
| Sprint | | Daniel Smiths | 0077133025-1 | Feb 11 - Feb 28 | Mar 1, 2006 | 3 of 13 |

Charges

| (913) 559-9799 | |
|---|---|
| Fair & Flexible Plan - 800 Anytime Minutes Included | $79.99 |
| Mobile Vision Package | TRIAL |
| Roadside Rescue | $5.00 |
| iTunes - More Than a Feeling - (XXX) XXX-XXXX | $1.50 |
| Match.com - Subscription - (XXX) XXX-XXXX | $5.00 |
| 76 Roaming Minutes @ .50/min | $38.00 |
| Overage: 105 Additional Anytime Minutes | $10.00 |
| 3 International Text Messages - France @ .40/msg | $1.20 |
| 2 International Text Messages - Germany @ .40/msg | $.80 |
| 4 International Text Messages - Italy @ .40/msg | $1.60 |
| REFUND: Dropped Call Adjustment | -$.30 |
| | |
| Additional Sprint Charges | $5.81 |
| Government Taxes & Fees | $22.41 |
| Total | $171.01 |

PRIMARY CONTENT

Your free Vision trial expires on May 13, 2006. After that, you will be charged $15.00 per month, per phone unless you contact Sprint Customer Service to cancel.
ANCHORED CONTENT

You saved $XX.XX this month by choosing Fair & Flexible over a comparable Free & Clear plan.
ANCHORED CONTENT

You were given credit for dropped calls totalling 6 Anytime Minutes.
ANCHORED CONTENT

| Additional Anytime Minutes | |
|---|---|
| 1-100 | $5.00 |
| 101-200 | 10.00 |
| 201-300 | 15.00 |
| 301-400 | 20.00 |
| 401-500 | 40.00 |
| 501-600 | 60.00 |
| 601-700 | 80.00 |
| 701-800 | 100.00 |
| 801-900 | 120.00 |
| 901-1000 | 140.00 |
| 1001-1100 | 160.00 |
| 1101-1200 | 180.00 |
| >1200 | .05/min |

FLOATING CONTENT

FIG. 7

COMPUTERIZED METHOD FOR DYNAMIC CONTENT PLACEMENT IN A DOCUMENT

FIELD OF THE INVENTION

The present invention relates to document generation and, more particularly, to laying out content in a document. The invention can usefully employed to facilitate generation of customer invoices such as telecommunication service invoices for instance, but the invention can equally apply in the generation of other documents as well.

BACKGROUND

In general, it is known for a document designer to manually lay out content, such as text and graphics for instance, on a document. However, manually laying out content is tedious and can become overly-burdensome or impossible when the need arises to lay out a mass quantity of individually unique documents, such as individual customer invoices for instance.

Further, it is known for a computer to automatically print or otherwise output content onto a document. However, notwithstanding advances in computer technology, such automated content layout tends to be very rudimentary. For instance, a computer may be able to print a list of items in series on a page, one after the other, or may be able to print items in predefined cells of a table. However, such basic, rote layout mechanisms are also insufficient when it comes to laying out and printing large numbers of individually unique documents.

SUMMARY

The present invention advances over the state of the art, by providing an improved mechanism for automatically establishing a layout of content for a document, such that the document when generated will bear the content arranged in the automatically established layout. As noted above, the document can be a telecommunication services invoice, or the document can take any of a variety of other forms.

In one respect, an exemplary embodiment of the invention may take the form of a computerized method of dynamically laying out a document in a document space defined in computer memory, so as to facilitate subsequent output of the document for viewing by a user. The exemplary method may involve, in order: (1) positioning one or more primary content portions in the documents space, (2) for each of one or more secondary content portions that is associated respectively with a given primary content portion thereby positioned in the document space, positioning the secondary content portion in the document space in spatial correlation with the associated primary content portion, and (3) for each of one or more tertiary content portions that is associated respectively with a group of one or more primary content portions, positioning the tertiary content portion in the document space in spatial correlation with the associated group of one or more primary content portions.

In this exemplary method, the function of positioning the secondary content portion in the document space in spatial correlation with the associated primary content portion may involve (a) attempting to position the secondary content portion in the document space in spatial correlation with the associated primary content portion, and (b) if insufficient space exists in the document space to position the secondary content in spatial correlation with its associated primary content portion, then declining to position the secondary content portion in the document space.

Further, the function of positioning each of one or more secondary content portions in the document space may involve (a) identifying a plurality of secondary content portions that are each associated with any primary content portion positioned in the document space, (b) sorting the plurality of identified secondary content portions in priority order, and (c) taking the secondary content portions in the sorted order, attempting to position each secondary content portion in the document space and, if insufficient space exists in the document space to position a given secondary content in spatial correlation with its associated primary content portion, then declining to position the given secondary content portion in the document space.

Likewise, the function of positioning the tertiary content portion in the document space in spatial correlation with the associated group of one or more primary content portions may involve (a) attempting to position the tertiary content portion in the document space in spatial correlation with the associated one or more primary content portions, and (b) if insufficient space exists in the document space to position the given tertiary content in spatial correlation with its associated group of one or more primary content portions, then (i) identifying, in the document space, a given secondary content portion that has a lower priority than the given tertiary content portion, (ii) removing the given secondary content portion from the document space, and (iii) then again attempting to position the given tertiary content portion in the document space.

In this regard, the function of identifying the given secondary content portion that has a lower priority than the given tertiary content portion may involve (i) identifying a plurality of secondary content portions that each have a lower priority than the given tertiary content portion, and (ii) selecting as the given secondary content portion a secondary content portion of the identified plurality that has a lowest priority of the identified plurality of secondary content portions.

In another respect, an exemplary embodiment of the invention may take the form of another method of dynamically laying out a document in a document space defined in computer memory, to facilitate subsequent output of the document for viewing by a user. In this method, the document space defines one or more document regions, and the method may involve carrying out at least three functions.

First, the method may involve positioning one or more primary content portions in the document space, such that each of the one or more primary content portions is thereby positioned in a region of the one or more regions.

Second, the method may involve, for each of one or more secondary content portions that is associated respectively with a given primary content portion positioned in a region of the document space, taking the one or more secondary content portions in priority order, (i) positioning the secondary content portion in the region in a manner that spatially correlates the secondary content portion with the associated primary content portion, if space in the region permits, and (ii) if space in the region does not permit, then discontinuing positioning of the secondary content portion. Further, the method may involve dynamically generating or customizing at least one of the one or more secondary content portions based on at least one of one or more primary content portions.

And third, the method may involve, for each of one or more tertiary content portions that is associated with a given one of the one or more regions, (a) positioning the tertiary content portion anywhere in the given region if space in the region permits, (b) if space in the region does not permit and if the region contains a given secondary content portion with a priority lower than the tertiary content portion, then removing the given secondary content portion and repeating from step a, and (c) if space in the region does not permit positioning the tertiary content portion anywhere in the region, then (i) identifying a plurality of secondary content portions already positioned in the region and each having a priority lower than the tertiary content portion and (ii) selecting as the given secondary content portion a secondary content portion of the identified plurality that has the lowest priority of the identified plurality of secondary content portions.

In this exemplary method, the function of positioning the secondary content portion in the region in a manner that spatially correlates the secondary content portion with the associated primary content portion may involve positioning the secondary content portion in the region in a position adjacent to the associated primary content portion, and positioning in the region an arrow that points from the secondary content portion to the associated primary content portion. In that way, the arrow in the output document provides a visual indication of the association between the secondary content portion and the associated primary content portion.

In another respect, an exemplary embodiment of the invention may take the form of a document creation method. Such a method may involve carrying out any of the foregoing computerized methods dynamically laying out a document in a document space defined in computer memory and may then involve outputting the resulting document for viewing by a user, such as by outputting the document on presentation means selected from the group consisting of (i) a computer display screen and (ii) paper.

And in another respect, the exemplary embodiment may take the form of a method that involves carrying out any of the foregoing computerized methods of dynamically laying out a document in a document space, respectively for each of a plurality of unique sets of primary, secondary, and tertiary content portions. Through that process, a unique layout can be established respectively for each of a plurality of documents. Further, the exemplary embodiment may take the form of a document creation method that involves (i) applying this process to generate a unique layout respectively for each of a plurality of documents and (ii) outputting each of the plurality of documents for user-viewing, such as on a computer display screen or on paper.

Still further, an exemplary embodiment of the invention may take the form of a computerized method of generating invoices for telecommunication service. Such a method may involve, respectively for each of a plurality of service accounts, carrying out at least the following functions in order.

First, the method involves virtually positioning primary invoice data in a document space defined in computer memory. Next, the method may involve identifying secondary invoice data associated with the virtually-positioned primary invoice data.

Next, the method may involve making a first determination of whether space permits to virtually position the identified secondary invoice data in the document space in a manner that spatially correlates the secondary invoice data with the associated primary invoice data, and (i) if the first determination is yes, then virtually positioning the identified secondary invoice data in the document space in the manner that spatially correlates the secondary invoice data with the associated primary invoice data, but (ii) if the first determination is no, then declining to position the identified secondary invoice data in the document space.

In turn, the method may involve identifying tertiary invoice data associated with the virtually-positioned primary invoice data. And the method may then involve making a second determination of whether space permits to virtually position the identified tertiary invoice data in the document space, and (i) if the second determination is yes, then virtually positioning the identified tertiary invoice data in the document space, but (i) if the second determination is no and if a lower priority piece of secondary invoice data has already been positioned in the document space, then removing the lower priority piece of secondary invoice data from the document space and repeating the function of making the second determination and responding to the determination as described in this paragraph. Finally, the method may then involve outputting an invoice corresponding to the document space, for viewing by a user.

These and other aspects and advantages will become more apparent to those of ordinary skill in the art by reading the following detailed description, with reference where appropriate to the accompanying drawings. Further, it should be understood that this summary and the description below are intended to explain operation of the invention by way of example only and are not intended to limit the scope of the invention, which is defined by the claims.

DETAILED DESCRIPTION

A preferred embodiment of the invention assumes that a document when generated may bear at least three categories of content, generally referred to herein as "primary content", "secondary content", and "tertiary content." Primary content may be basic, core content of the document, while secondary and tertiary content may be supplemental to that basic content. For example, if the document is a telecommunication service invoice, the primary content may be text setting forth the consumer's usage and cost for the billing period at issue, while the secondary and tertiary content may be sidebar notices explaining aspects of the consumer's bill, providing the consumer with subscription information or offers, or promoting other goods and services.

Pieces of secondary content may be related specifically to pieces of primary content, such that it would be sensible to lay out each piece of secondary content adjacent to or otherwise spatially correlated with the associated piece of primary content. For instance, in a telecommunication service invoice, a piece of secondary content may be a sidebar explanation of particular usage/cost information set forth in the bill. (Further, the secondary content may be derived from or otherwise based on the primary content to which it relates.) As such, secondary content may also be referred to herein as "anchored content"—in that the secondary content should be laid out in a manner spatially correlated with a particular piece of primary content.

Pieces of tertiary content may be more general in relevance than pieces of secondary content. For instance, pieces of tertiary content may be related generally to the document and not necessarily to any particular piece of primary content. Alternatively, pieces of tertiary content may be related generally to a group of primary content, while secondary content may be related specifically to a piece of primary content in the group. As such, tertiary content may also be referred to herein as "floating content"—in that the tertiary content is not as restricted in its spatial layout as secondary content is.

In accordance with an exemplary embodiment of the invention, the primary content that is to be laid out on the document will include one or more primary content portions (e.g., text or graphics), each having a corresponding ID. Similarly, the secondary content to be laid out on the document will include one or more secondary content portions (e.g., text or graphics), each also having a corresponding ID. And the tertiary content to be laid to be laid out on the document will include one or more tertiary content portions (e.g., text or graphics), each similarly having a corresponding ID.

These various content portions and their respective IDs can be established in advance through manual input or automatically through transfer or derivation from one or more data sources. For instance, if the document is a telecommunication service invoice, some or all of the primary content portions may be established programmatically by retrieving data from a service provider's subscriber database and billing system, combining that data with canned descriptive text in a predefined manner, and assigning an ID through series or random designation or in any other manner desired. Similarly, secondary and tertiary content portions may be established programmatically based on subscriber data and/or may be manually entered or established in some other way, and corresponding IDs assigned as well.

In line with the discussion above, each secondary (anchored) content portion will be associated respectively with a particular primary content portion, such that it would be desirable on the document to position the secondary content portion adjacent to or otherwise spatially correlated with the associated primary content portion. For instance, on a telecommunication service invoice, a primary content portion might be text describing the quantity of communication service used by the customer in the billing period at issue, and the associated secondary content may be a notice to the customer suggesting that the customer change to a service plan that is more commensurate with that quantity of use.

As such, a secondary content portion can be established programmatically at run time, at least in part by derivation from its associated primary content portion. For instance, if a primary content portion describes a number of overage minutes used by a subscriber in a billing period, an associated secondary content portion may be programmatically established (i) by calculating the subscriber's savings in overage costs as a result of the subscriber's chosen service plan and (ii) establishing text that states how much the subscriber saved in overage costs by choosing that plan.

Further, association between secondary content and primary content can be established through manual data entry or can be determined programmatically, depending on the scope of the primary content for instance. In the service-plan example, for example, a computer can determine at the time of invoice layout that the primary content describes a quantity of use that exceeds a predefined threshold, and the computer can responsively select or establish a secondary content portion in the form of a service-plan-change notice to be positioned on the document in association with that primary content portion. Moreover, the association between secondary content and primary content can be recorded in computer memory by reference to the corresponding IDs of the associated content portions.

Also in line with the discussion above, each tertiary (floating) content portion may also be associated with particular primary content. However, a tertiary content may be more generally associated with a group of one or more primary content portions, such that it would be desirable on the document to position the tertiary content portion adjacent to or otherwise spatially correlated with the associated primary content group. (The primary content group may itself contain only one primary content portion, in which case the tertiary content portion may effectively be associated with only a single primary content portion, akin to a secondary content portion. Alternatively, the primary content group may contain multiple primary content portions, in which case the tertiary content portion may be associated generally with those primary content portions.)

In practice, this general association between a tertiary content portion and a group of one or more primary content portions may be defined as an association between the tertiary content portion and any primary content portion of the group. Thus, the tertiary content portion may be associated with a given primary content portion but, by virtue of the fact that it is a tertiary content portion (rather than a secondary content portion), the tertiary content portion may thereby be associated with the group of one or more primary content portions of which the given primary content portion is a member. Further, as with secondary content, the association between tertiary content and primary content may be established by manual data entry or can be determined programmatically.

Each secondary and tertiary content portion will further have a respective priority level, which can be designated expressly or can be considered to exist implicitly (e.g., as a default, non-designated value). The priority level of each secondary and tertiary content portion indicates the importance of including the content portion on the document. For instance, if it is very important to include a particular secondary content portion on the document, then that secondary content portion may be given a very high priority level. On the other hand, if a secondary content portion is not very important, then that secondary content portion may be given a relatively low priority level. The same goes for tertiary content portions.

The priority level of each secondary and tertiary content portion may be designated by an author or administrator at the time the secondary and tertiary content portions are created, and perhaps at the time the associations between such secondary and tertiary content portions and primary content portions are established. For instance, through manual data entry, a document administrator may enter a secondary content portion, designate an association between that secondary content portion and a particular primary content portion (perhaps designating an association to exist at run time depending on the primary content portion value at that time), and designate the priority level of the secondary content portion. This entered information may then be stored in a data record in computer memory, for reference and use within the inventive process. Alternatively, if the secondary or tertiary content portion is generated programmatically, its priority level can be designated programmatically based on predefined business rules specifying priority levels for particular types of content portions.

In accordance with the exemplary embodiment, the process of automatically establishing a content layout for a document will involve a computer virtually laying out the content in a "document space" representing the document in computer memory, with the computer executing program instructions to dynamically determine where to place certain content portions in the document space. Preferably, the computer will begin by virtually positioning all of the primary content in the document space, and the computer will then dynamically determine which (if not all) of the secondary and tertiary content to virtually position in the document space, considering factors such as (i) associations with primary content and (ii) priority levels of the secondary and tertiary content portions. Once the computer has completed its virtual layout of the document in memory, the computer may then generate or output the document in final form, such as in the form of a file that can be printed on paper or presented on a display screen. The document space, and the resulting document, may span one or more pages (e.g., printed or displayed pages).

The document space defined in computer memory may be characterized by a grid system represented by a two-dimensional array, so that the computer can record where it positions various content portions in the document space and the range of document space consumed by each positioned content portion. Thus, for instance, as the computer virtually positions a content portion on the document, the computer may record in memory the grid positions consumed by the content portion, for later reference when deciding whether and where to position one or more other content portions on the document.

Figure 1:
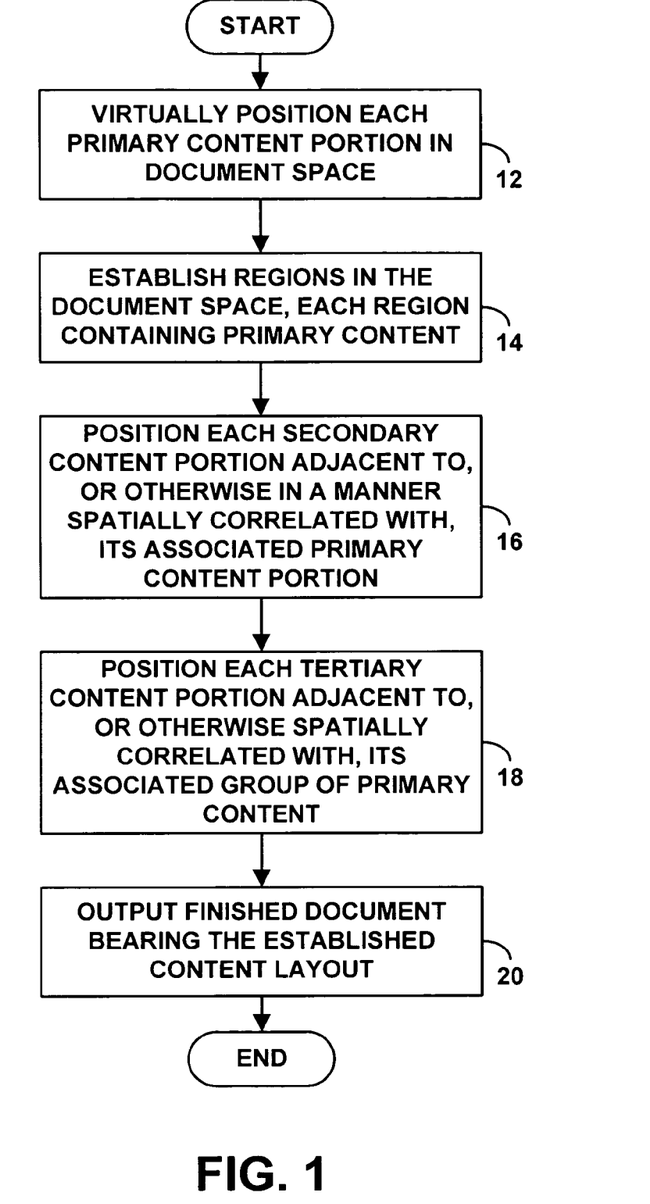
FIG. 1 is a flow chart depicting functions carried out in accordance with an exemplary embodiment of the invention.

FIG. 1 is a flow chart depicting a set of functions that can be carried out in accordance with the exemplary embodiment. The following description will proceed with reference to the functions shown in FIG. 1.

As noted above, in a preferred embodiment, the computer will begin by virtually positioning the primary content in the document space, as shown in FIG. 1 at step 12. Thus, for each primary content portion that is to be positioned on the document, the computer will record where the primary content portion is virtually situated in the document space (e.g., with reference to an origin point and a range of grid positions).

The process of the computer virtually positioning primary content portions in the document space may be as simple as sequentially laying out the primary content portions in a predefined order, including designated spacing between portions. For instance, the computer may virtually position a first primary content portion in the document space, the computer may then position a second primary content portion below the first primary content portion, and so forth, until all of the primary content portions are laid out. The computer may apply spatial restrictions to placement of the primary content portions, such as restricting the portions to particular table cells, or to a particular side of the document space for instance, and the computer may apply other defined layout characteristics for positioning the primary content portions.

Furthermore, the process of the computer virtually positioning the primary content portions in the document space may be partially or wholly directed by a user, through a graphical user interface for instance. At one extreme, for instance, a user could literally design the entire layout of the primary content portions on the document, through interaction with a graphical user interface defined programmatically by the computer, and the computer may then virtually record in memory the positions of the one or more primary content portions (thus virtually positioning the primary content portions) as those positions are defined by the user. At another extreme, the computer can programmatically retrieve the primary content from data storage and automatically position the primary content in the document space, recording demarcations between the positioned primary content portions. Any other mechanism, now known or later developed, for virtually laying out the primary content in the document space is acceptable as well.

In the exemplary embodiment, at step 14, the computer will establish one or more "regions" of the document space (and thus ultimately of the finished document), which will be used by the computer to determine where to place various secondary and tertiary content. Each region may contain a group of one or more primary content portions. For instance, each region may be related to a particular subject of primary content. In the telecommunication service invoice example, for example, one region may contain primary content portions related to a billing/usage summary, such as (i) a primary content portion setting forth usage and cost for the billing period at issue, (ii) another primary content portion setting forth charges for premium content purchases, and (iii) another primary content portion setting forth taxes and surcharges. Another region may then contain a primary content portion setting forth a description of the subscriber's service plan. And still another region may contain call detail records for the subscriber, including perhaps multiple primary content portions, one for each phone in a shared plan for instance. Other examples are possible as well.

For a document that will span multiple pages, a single region can be defined per page, or multiple regions could be defined on any given page. Further, it is possible that a region defined in the document space may contain no primary content at all.

Although FIG. 1 shows the region-definition function 14 occurring after the primary content layout function 12, the computer may define the regions in computer memory as the computer virtually lays out the primary content in the document space. Further, the region demarcations may be defined in advance by a user, such as by manual data entry indicating one or more primary content portions that should be contained in particular regions, and such as by designating the order of region placement in the document space. Alternatively, the region demarcations may established by the computer dynamically at run time, such as by demarcating regions according to the source or type of data defined by various primary content portions. (For instance, the computer may programmatically designate all billing/usage summary data to be in a particular region of the document space, all plan-description data to be in another particular region of the document space, and all call-detail data to be in another particular region of the document.) Other mechanisms for virtually establishing the regions of the document space may be possible as well. Further, at a limit, a given region can be defined to span the entire document space.

Upon virtually laying out primary content portions and defining regions in the document space, the computer will have in its memory a record of the position and extent of each primary content portion, and a record of the position and extent of each region. With this information, the computer will then be able to virtually position secondary and tertiary content, in relation to the primary content.

It should be understood that the layout that results from this process of dynamically, virtually laying out primary content in the document space can vary from document to document, depending on one or more characteristics of the primary content. For instance, in some instances, one or more primary content portions may be non-existent (or empty) and may thus not need to be positioned. Further, the size of each primary content portion may vary from document to document and may thus take up less document space in one instance of the document than in another. Considering telecommunication service invoices, for instance, the invoice for a subscriber with very little usage may contain a very small or non-existent call-detail section that will consume little if any extent of the document space, whereas the invoice for a subscriber with extensive usage may contain a very large call-detail section that will consume a large extent of the document space.

After virtually establishing the primary content layout, the computer will next embark on a process of virtually positioning the secondary and tertiary content in the document space. As noted above, each secondary content portion may be associated with a particular primary content portion. Thus, at step 16, the computer will strive to position each secondary content portion adjacent to, or otherwise in a mariner spatially correlated with, its associated primary content portion. On the other hand, each tertiary content portion may be associated more generally with a group of one or more primary content portions, and thus, at step 18, the computer will strive to position each tertiary content portion adjacent to, or otherwise spatially correlated with, that group of primary content. As noted above, each region of the document space may contain a group of one or more primary content portions. Thus, each tertiary content portion may be associated generally with a region of the document space.

In the preferred embodiment, the computer will establish these spatial correlations by positioning the secondary and tertiary content, to the extent possible, in the same regions as their associated primary content. In particular, given a secondary content portion associated with a primary content portion, the computer will attempt to position the secondary content portion adjacent to or otherwise spatially correlated with the primary content portion, in the same region of the document space as the primary content portion. Further, given a tertiary content portion associated with a group of one or more primary content portions, the computer will attempt to position the tertiary content portion anywhere within the region that contains the one or more primary content portions. The computer will apply this process on a region-by-region basis.

A difficulty that arises in this layout process, however, is that each region of the document space is of finite size. Thus, once the computer has virtually laid out the primary content portions, there is a chance that insufficient space may remain to lay out one or more secondary or tertiary content portions desired to be included in the region. In accordance with the exemplary embodiment, the computer will overcome this problem by using the priority levels of the secondary and tertiary content portions in deciding whether and where to place the secondary and tertiary content in a given region.

In practice, for a given region, the computer will first attempt to virtually lay out each secondary content portion, as indicated in FIG. 1 at step 16. This process is further illustrated by the flow chart of FIG. 2.

Figure 2:
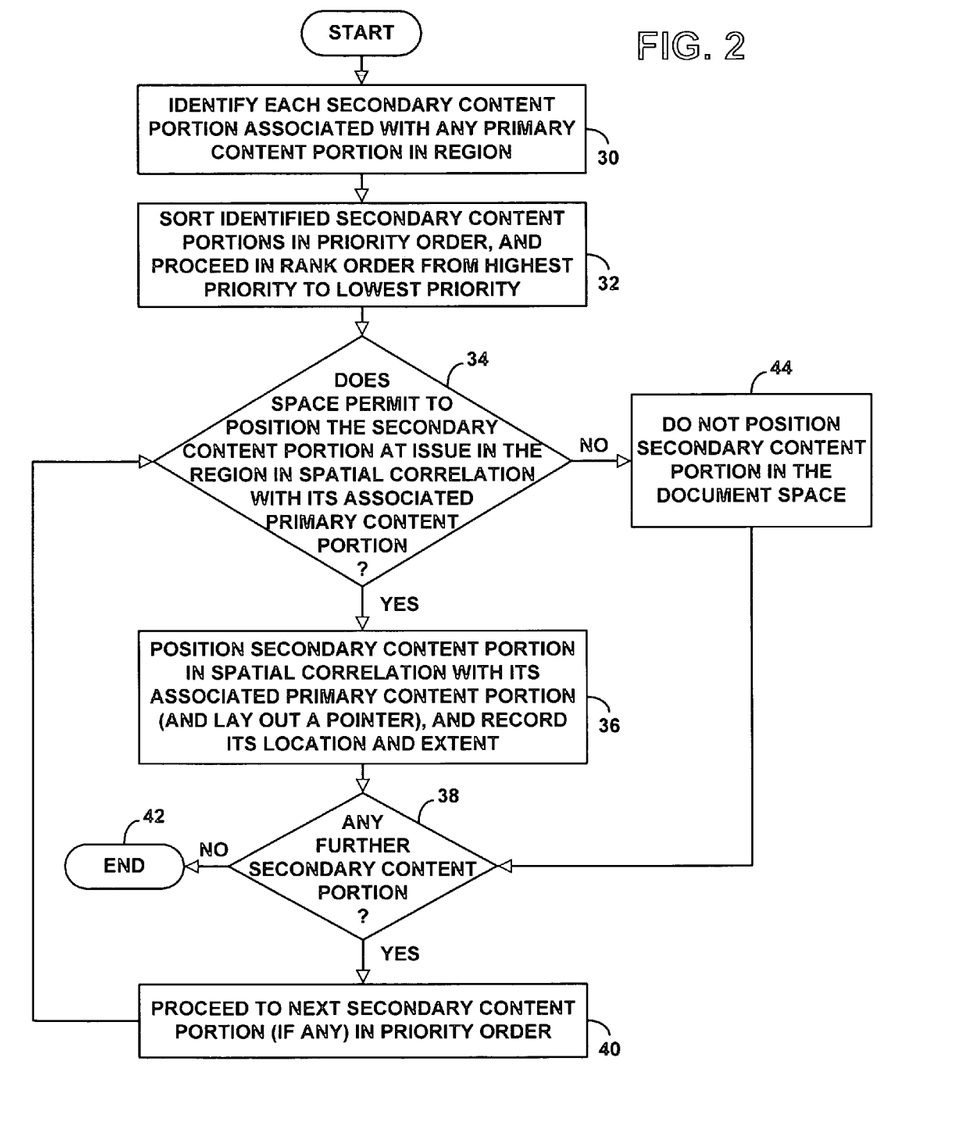
FIG. 2 is a flow chart depicting functions carried out in accordance with the exemplary embodiment to lay out secondary content.

As shown in FIG. 2, at step 30, the computer may first refer to its stored association-data to identify each secondary content portion (if any) that is associated with any primary content portion in the region and that should therefore be laid out adjacent to or otherwise spatially correlated with that primary content portion in the region. At step 32, if the computer thereby identifies more than one secondary content portion that should be positioned in the region, the computer may then sort the identified secondary content portions in order of their priority, from highest to lowest. Any ties in priority can be handled by randomly ordering the content.

Taking the identified secondary content portions in rank order from highest priority to lowest priority, the computer may then attempt to virtually position each secondary content portion adjacent to, or otherwise spatially correlated with, its associated primary content portion in the region.

To do so for each secondary content portion at issue, at step 34, the computer may determine if space permits to position the secondary content portion in the region. If other content is already laid out in the region in a manner that leaves insufficient space to lay out the secondary content portion adjacent to or otherwise in spatial correlation with its associated primary content portion (or if other layout rules dictate), the computer may conclude that space does not permit to position the secondary content portion in the region. Otherwise, the computer may conclude that space permits to position the secondary content portion in the region.

For each such secondary content portion, at step 36, if the conclusion is that space permits to thus position the secondary content portion, the computer will do so in the document space and may thus record the location and extent of the secondary content portion. Further, the computer may also position in the document space an arrow (e.g., text or graphical) or other similar element (e.g., a picture of a hand pointing, or the like) that points from the positioned secondary content portion to the associated primary content portion, so as to provide a clear visual indication of the relationship when the resulting document is viewed by a user. At step 38, the computer may then determine if any further secondary content portion remains for layout in the region. If so, at step 40, the computer may then proceed to the next secondary content portion in rank order and may thus return to step 34. Otherwise, at step 42, the process of laying out the secondary content portions in the region ends.

On the other hand, at step 44, if the computer determines that insufficient space exists to position the secondary content portion, the computer will not include the secondary content portion in the document space. The rationale for excluding the secondary content portion in this instance is that it is assumed to be meaningful only with respect to its associated primary content portion. Thus, if space does not exist to position the secondary content portion adjacent to or otherwise spatially correlated with its associated primary content portion, it may not make sense to include it in the document at all. At that point, the computer may then proceed to step 38, to determine if any further secondary content portion remains for layout, and so forth as described above.

Once the computer has finished virtually laying out the one or more identified secondary content portions (to the extent possible) in the region, the computer will then attempt to virtually lay out each tertiary content portion associated with the region, as indicated in FIG. 1 at step 18. This process is further illustrated by the flow chart of FIG. 3.

Figure 3:
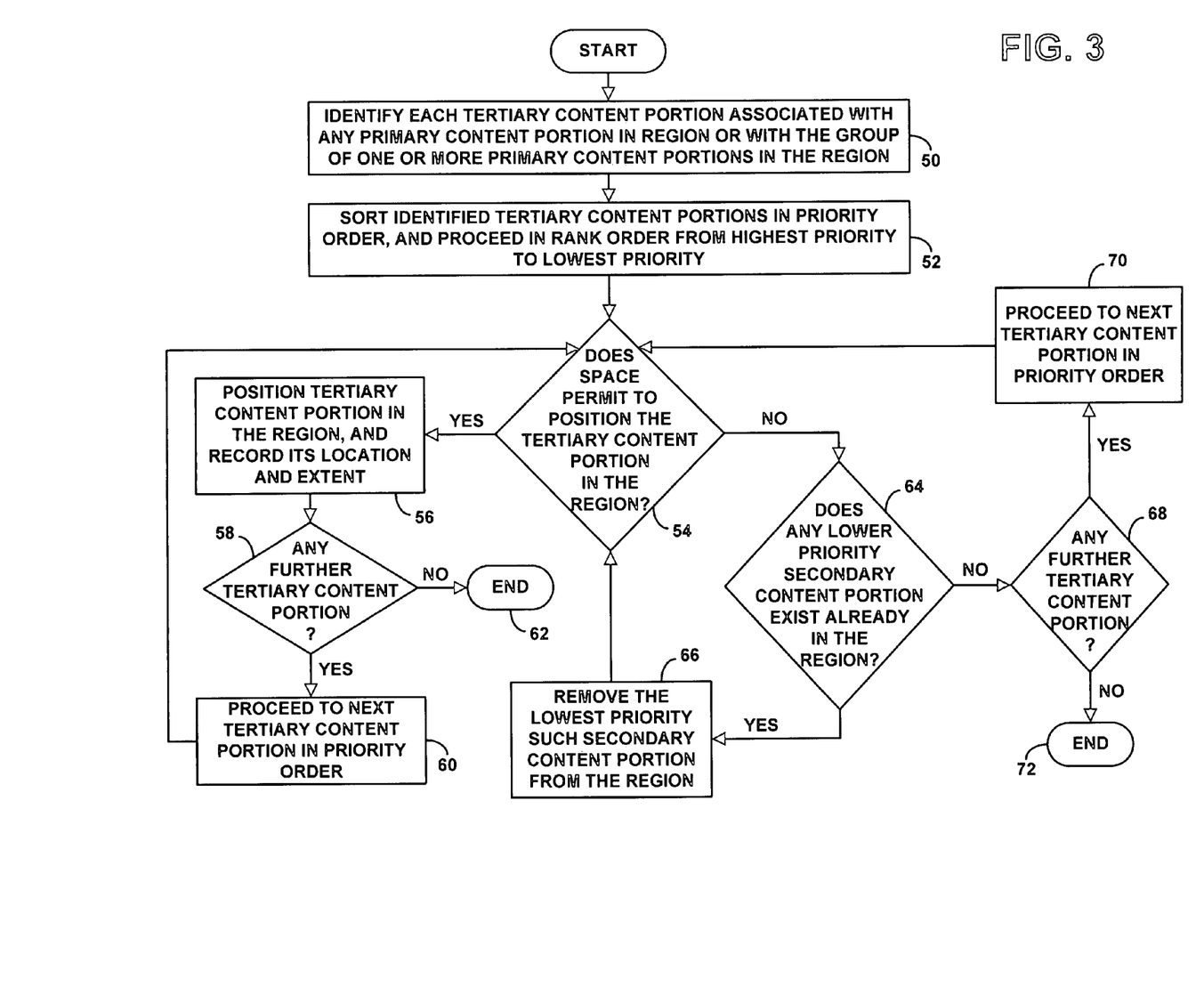
FIG. 3 is a flow chart depicting functions carried out in accordance with the exemplary embodiment to lay out tertiary content.

As shown in FIG. 3, at step 50, the computer may first refer to its stored association-data to identify each tertiary content portion (if any) that is associated with any primary content portion in the region or that is otherwise associated with the group of one or more primary content portions in the region, so as to identify those tertiary content portions that should be laid out in the region. At step 52, if the computer thereby identifies more than one tertiary content portion that should be positioned in the region, then the computer may sort the identified tertiary content portions in order of their priority, from highest to lowest. Any ties in priority can be handled by randomly ordering the content.

Taking the identified tertiary content portions in rank order from highest priority to lowest priority, the computer may then attempt to virtually position each tertiary content portion in any available position in the region, as tertiary content is associated generally with the region.

To do so for each tertiary content portion at issue, at step 54, the computer may determine if space permits to position the tertiary content portion in the region. If other content is already laid out in the region in a manner that leaves insufficient space to lay out the tertiary content portion anywhere in the region, then the computer may conclude that space does not permit to position the tertiary content portion in the region. Otherwise, the computer may conclude that space permits to position the tertiary content portion in the region.

For each tertiary content portion, at step 56, if the computer determines that space exists in which to position the tertiary content portion in the region, the computer will do so in the document space and may thus record the location and extent of the tertiary content portion. At step 58, the computer may then determine if any further tertiary content portion remains for layout in the region. If so, at step 60, the computer may then proceed to the next tertiary content portion in rank order and may thus return to step 54. Otherwise, at step 62, the process of laying out the tertiary content portions in the region ends.

On the other hand, at step 64, if the computer determines that insufficient space exists to fit the tertiary content portion in the region, the computer will next determine whether any already-placed secondary content portion has a priority level lower than that of the tertiary content portion at issue, and, if multiple such lower priority secondary content portions exist in the region, the computer will identify the one with the lowest priority level. If the computer thereby identifies a secondary content portion with a priority lower than that of the tertiary content portion at issue, at step 66, then the computer will remove that secondary content portion from the document space, on grounds that the tertiary content portion is more important, and the computer will once again attempt to virtually position the tertiary content portion in the region, i.e., returning to step 54. The computer will repeat this process for the piece of tertiary content at issue until (i) the computer determines that there is insufficient space in the region to fit the tertiary content portion and (ii) there are no lower priority secondary content portions to remove from the region.

At step 68, the computer may then determine if any further tertiary content portion remains for layout in the region. If so, at step 70, the computer may then proceed to the next tertiary content portion in rank order and may thus return to step 54. Otherwise, at step 72, the process of laying out the tertiary content portions in the region ends.

At this point, the virtual document layout will include one or more regions, with each region including one or more primary content portions each containing one or more primary content elements. Further, each region may contain secondary content dynamically positioned in spatial correlation with an associated primary content portion, and each region may further contain tertiary content to the extent space permits or, if space would not permit, then to the extent lower-priority secondary content could be removed to make room in the region for the tertiary content. The computer may further include on each page of the document layout (in a header or footer for instance) pertinent information, such as pagination and general or specific document descriptors. And the computer may include additional information beyond the primary, secondary, and tertiary content described here.

Once the computer has finished virtually laying out the document, as noted above, the computer will preferably output a finished document bearing the established layout, as shown in FIG. 1 at step 20. In a preferred embodiment, the computer may output the document encoded in a printable and/or displayable file, such as a PDF or TIFF format file for instance. The document may then be printed or displayed and may then be read by or otherwise presented to a person. The function of generating the resulting document based on the established virtual layout of the document can be largely the same as printing a document to PDF from a word processing application, in a manner well known in the art.

The output document produced in accordance with this process will thus bear the content layout as established virtually in the document space within computer memory. Advantageously, primary content will thus be laid out in a desired manner, secondary content will be laid out in spatial correlation with its associated primary content to the extent space permitted, and tertiary content will be laid out in general spatial correlation with an area of the document to the extent space permitted, with tertiary content portions taking precedence over lower priority secondary content portions.

Figure 4:
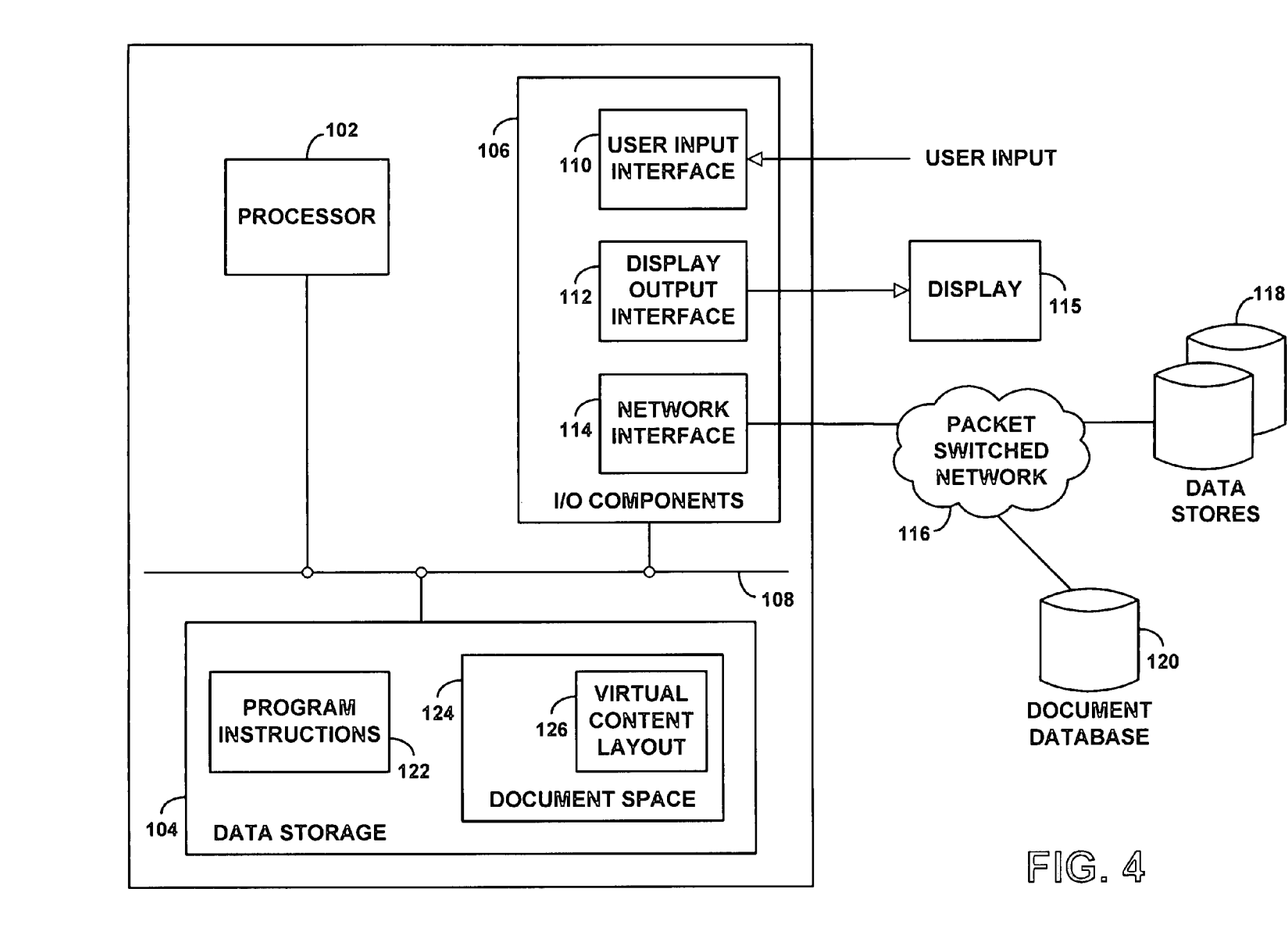
FIG. 4 is a simplified block diagram of a computer system arranged to implement the exemplary embodiment.

Provided with the foregoing disclosure, those skilled in the art will appreciate that a computer can be readily programmed with logic to carry out the inventive process. More generally, some or all of the functions described can be carried out by any combination of software logic, firmware logic, and hardware logic. FIG. 4 is a simplified block diagram depicting functional components of a computer 100 suitable for carrying out the exemplary embodiment.

As shown in FIG. 4, computer 100 includes a processor 102, data storage 104, and input/output (I/O) components 106, all of which may be communicatively linked together by a system bus, network, or other mechanism 108.

Processor 102 may comprise one or more general purpose processors (such as INTEL microprocessors for instance) and/or one or more special-purpose processors (e.g., digital signal processors or the like). Data storage 104 may comprise one or more volatile or non-volatile storage components, such as magnetic, optical, or organic storage, including memory storage, disc storage, or other sorts of data storage now known or later developed.

I/O components 106 then include a user input interface 110, a display output interface 112, and a network interface 114. User input interface 110 may receive input from a user, such as a document administrator or the like, through a keyboard, voice recognition system, or other input mechanism. Display output interface 114 may then comprise a display card that connects with a computer display 115, through which computer 100 may display resulting generated documents.

Network interface 112 may comprise an Ethernet interface suitable for connecting with a packet-switched network 116, or may take any other form. Through network interface 112, computer 100 may receive data defining part or all of the content to be laid out on one or more documents. For instance, in the telecommunication service invoice example, computer 100 may receive subscriber profile data and billing data from one or more data stores or systems 118 accessible via the network 116, defining content for layout in subscriber invoices. Further, through network interface 112, computer 100 may send documents generated in accordance with the present invention, for storage in a document database 120, and for later use of the generated documents (e.g., to print and mail or otherwise send to subscribers or others).

As shown, data storage 104 includes program instructions 122 and a document space 124, and the document space 124 is arranged to contain data representing a virtual content layout 126 established in accordance with the exemplary embodiment. The program instructions preferably embody the functions described above and are thus executable by processor 102 to carry out those functions. Accordingly, by executing the program instructions, processor 102 may receive and/or generate the various primary, secondary, and tertiary content portions as described above, respectively for each of a plurality of documents (such as individual subscriber invoices for instance), and for each document the processor 102 may virtually lay out the content in the document space 124 and then generate from the virtual layout a resulting document for viewing by a user.

Figure 5:
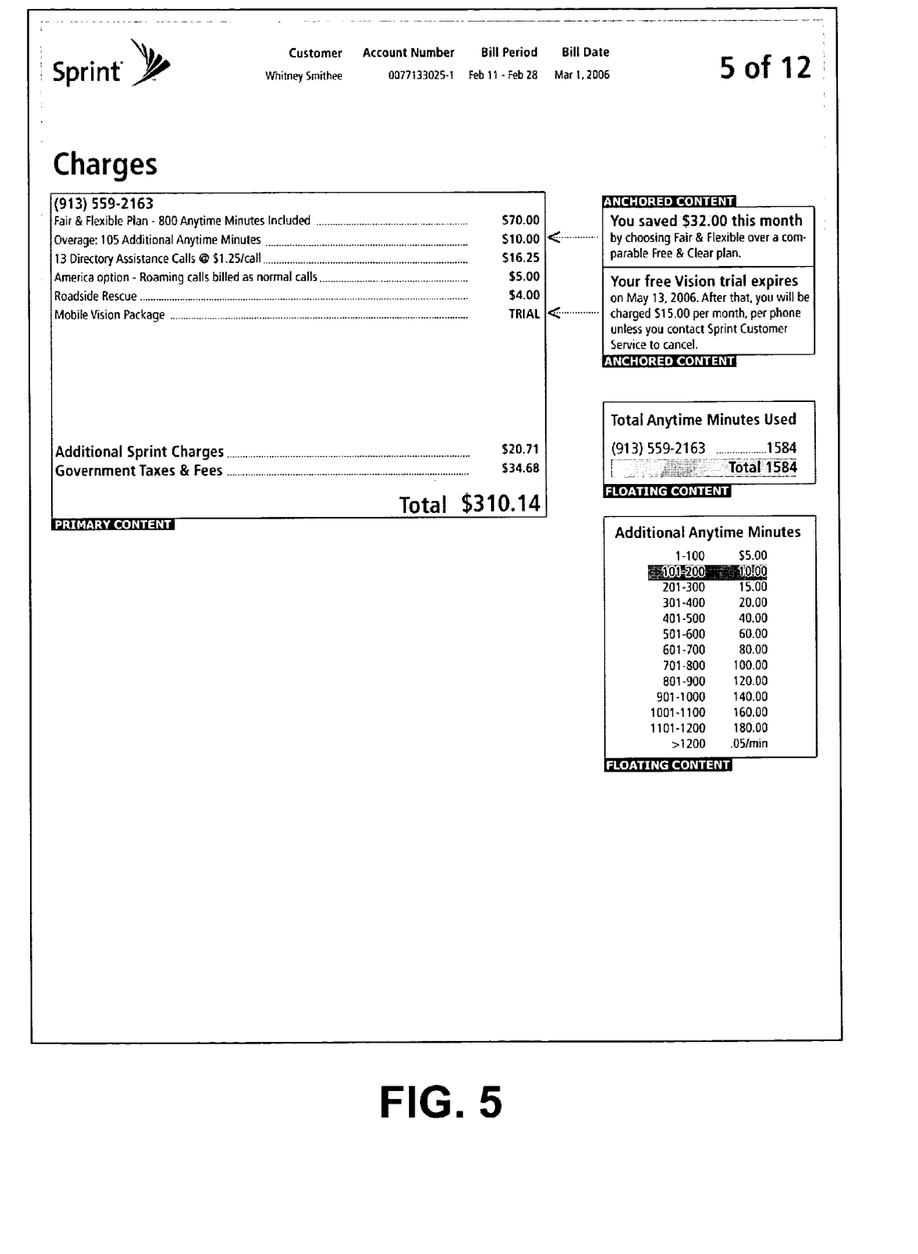
FIGS. 5-7 are exemplary pages of telecommunication service invoices that can be generated in accordance with the exemplary embodiment.
Figure 6:
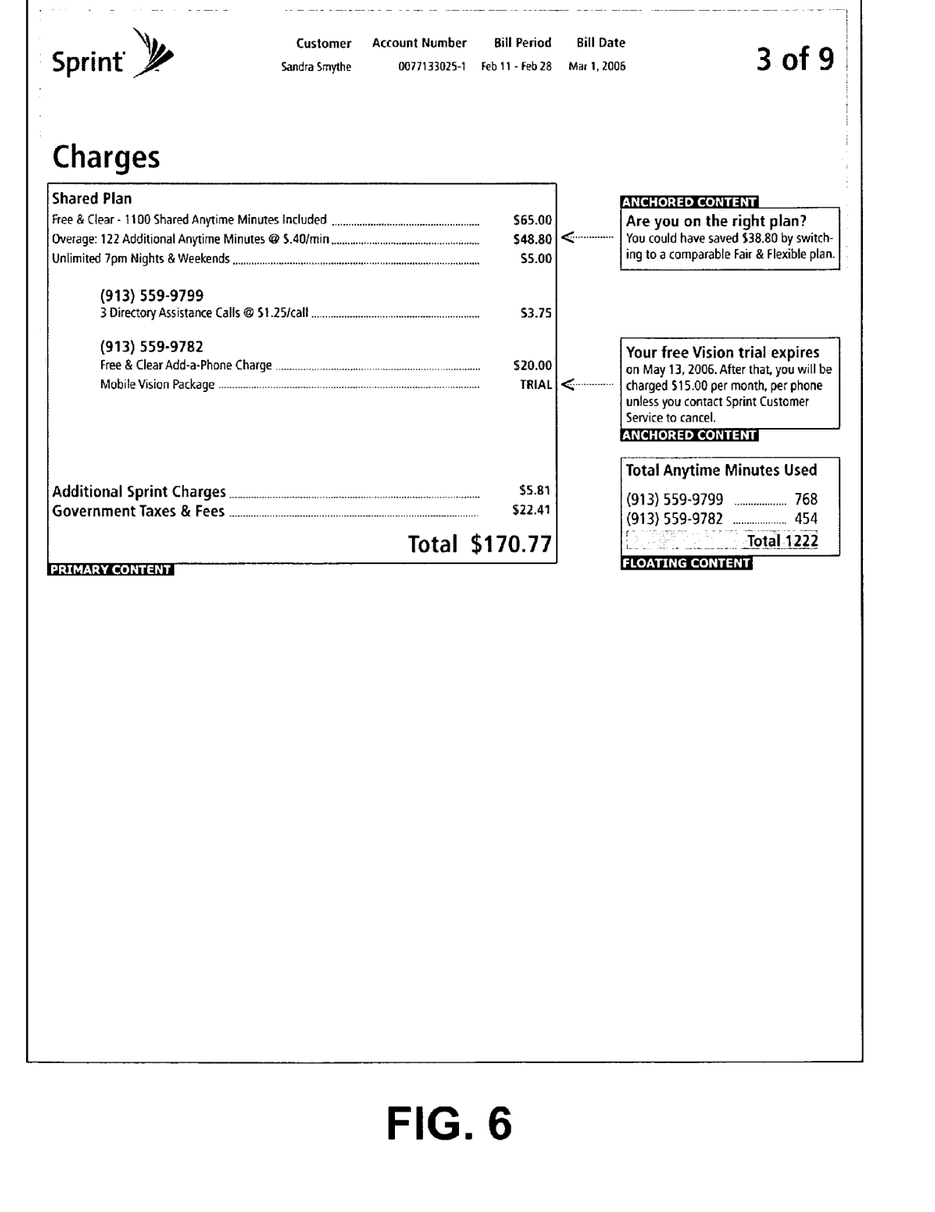
Figure 7:
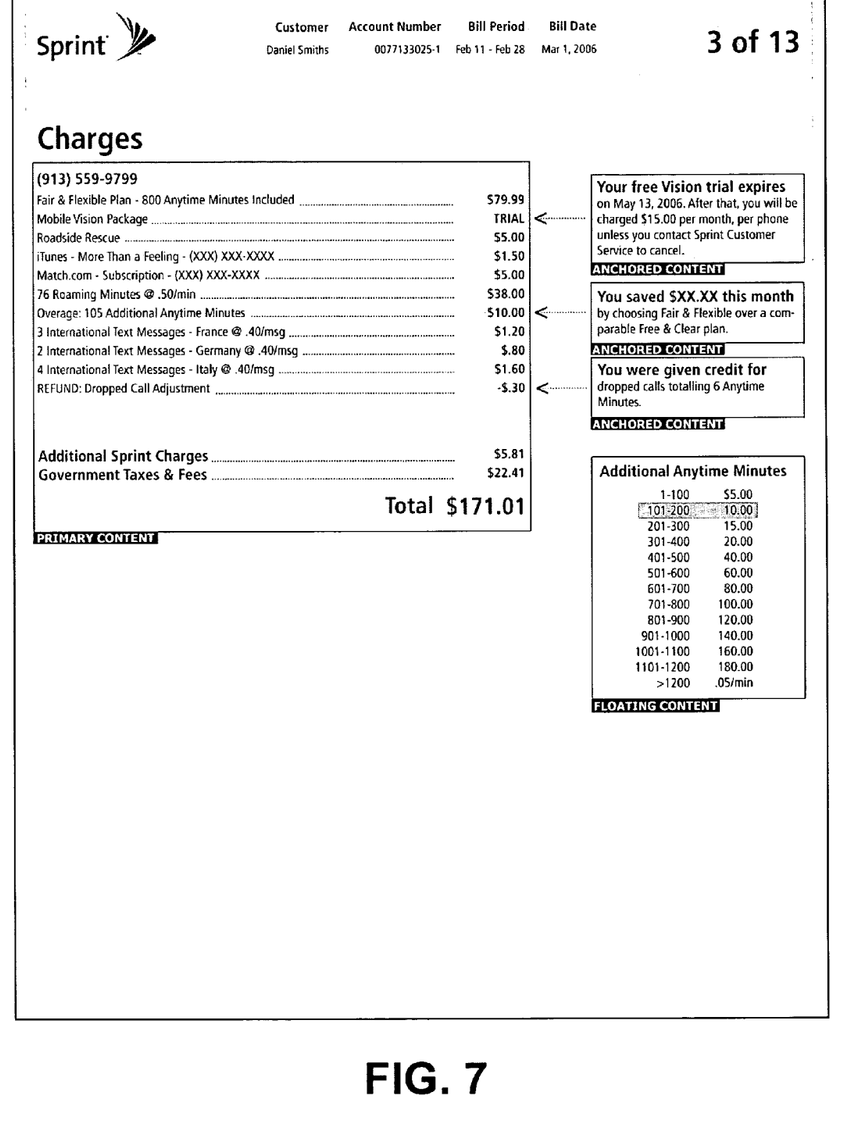

FIGS. 5-7 next provide examples of telecommunication service invoice pages that can be generated in accordance with the exemplary embodiment. In practice, a service provider or vendor may operate a computer arranged as described above to generate invoices including these pages, provided with subscriber profile data and billing data fed to the computer from back end systems and provided with any other input desired. Advantageously, this process may be used to generate many invoices, one for each subscriber, with each one having a unique, dynamically established content layout in accordance with the invention.

Each of the invoice pages shown in these figures is assumed, for simplicity, to contain a single region (plus additional header information such as information identifying the carrier, the subscriber, the bill, and the page number/count).

Referring first to FIG. 5, the region in this document space is shown containing a section of primary content on the left, and various anchored content (secondary content) and floating content (tertiary content) on the right. The boxes around the content, and the indicia reading "primary content", "anchored content", and "floating content" are not part of the document layout but are rather provided to illustrate the types of content in the document layout.

In this example, the primary content includes various primary content portions, each of which may be one of the lines of information shown in that section of the document. For instance, one primary content portion may be the text "(913) 559-2163", another primary content portion may be the text "Fair & Flexible Plan—800 Anytime Minutes Included . . . $70.00", and so forth. In establishing the virtual document layout for this page, the computer may receive or derive each primary content portion based on the subscriber profile and billing data and may lay out the primary content portions in series in the document space.

The region in this example is further shown including two anchored content portions. The top anchored content portion is shown laid out in spatial correlation with the primary content portion that reads "Overage: 105 Additional Anytime Minutes . . . $10.00", as the top anchored content portion describes something about that primary content portion (namely, how much the subscriber saved in overage minutes by selecting the service plan that the subscriber has). In establishing the virtual document layout for this page, the computer may receive or derive this anchored content portion and may lay it out in the illustrated spatial correlation with its associated primary content portion, taking into account priorities and space availability as described above. Likewise, the lower anchored content portion shown on this page is associated with another one of the primary content portions, and the computer may lay it out in a similar fashion.

The region in this example is still further shown including two floating content portions. One of the floating content portions describes the total minutes used by the subscriber, and the other floating content portion provides a minute-range continuum and highlights where the subscriber's usage falls within the continuum. These floating content portions relate generally to this particular region of the document, namely the charges incurred by the subscriber. In establishing the virtual document layout for this page, the computer may receive or derive these floating content portions and may position them in the document space in the manner described above, again taking into account priorities and space availability.

FIGS. 6 and 7 provide other examples similar to that in FIG. 5. FIG. 6 depicts an invoice page having various primary content portions, two anchored content portions, and one floating content portion. And FIG. 7 depicts an invoice page having various primary content portions, three anchored content portions, and one floating content portion. It should be understood of course that the particular content and arrangement of these invoice pages is entirely a matter of choice within the bounds of the inventive process, and that many variations are possible.

An exemplary embodiment of the present invention has thus been described. Those skilled in the art will understand, however, that changes and modifications may be made to this embodiment without departing from the true scope and spirit of the present invention, which is defined by the claims.

What is claimed is:

1. A computerized method of dynamically laying out a document in a document space defined in computer memory, to facilitate subsequent output of the document for viewing by a user, the method comprising, in order:

(a) a computer positioning one or more primary content portions in the document space;

(b) for each of one or more secondary content portions that is associated respectively with a given primary content portion thereby positioned in the document space and that has an associated priority, the computer positioning the secondary content portion in the document space in spatial correlation with the associated primary content portion, wherein positioning each of one or more secondary content portions in the document space comprises:

(i) identifying a plurality of secondary content portions that are each associated with any primary content portion positioned in the document space;

(ii) sorting the plurality of identified secondary content portions in priority order; and (iii) taking the secondary content portions in the sorted order, attempting to position each secondary content portion in the document space and, if insufficient space exists in the document space to position a given secondary content in spatial correlation with its associated primary content portion, then declining to position the given secondary content portion in the document space; and (c) for each of one or more tertiary content portions that is associated respectively with a group of one or more primary content portions and that has an associated priority, the computer positioning the tertiary content portion in the document space in spatial correlation with the associated group of one or more primary content portions, wherein positioning the tertiary content portion in the document space in spatial correlation with the associated group of one or more primary content portions comprises:

(i) making a determination of whether sufficient space exists in the document space to position the tertiary content portion in spatial correlation with the associated group of one or more primary content portions;

(ii) if the determination is that sufficient space exists, then positioning the tertiary content portion in spatial correlation with the associated group of one or more primary content portions; and (iii) if the determination is that that insufficient space exists, (1) identifying, in the document space, a secondary content portion that has a lower priority than the tertiary content portion, (2) removing the identified secondary content portion from the document space, and (3) repeating from (c)(i).

2. The method of claim 1, further comprising:
outputting the document for viewing by a user.

3. The method of claim 2, wherein outputting the document for viewing by a user comprises outputting the document on presentation means selected from the group consisting of (i) a computer display screen and (ii) paper.

4. The method of claim 1, further comprising carrying out (a), (b), and (c) respectively for each of a plurality of unique sets of primary, secondary, and tertiary content portions, thereby resulting in uniquely laying out respectively each of a plurality of documents.

5. The method of claim 4, further comprising:
outputting each of the plurality of documents for user-viewing.

6. The method of claim 1, wherein the document represents a telecommunication service invoice.

7. A computerized method of dynamically laying out a document in a document space defined in computer memory, to facilitate subsequent output of the document for viewing by a user, the method comprising, in order:
(1) a computer positioning one or more primary content portions in the document space;
(2) for each of one or more secondary content portions that is associated respectively with a given primary content portion thereby positioned in the document space and that has an associated priority, the computer positioning the secondary content portion in the document space in spatial correlation with the associated primary content portion;
(3) for each of one or more tertiary content portions that is associated respectively with a group of one or more primary content portions and that has an associated priority, the computer positioning the tertiary content portion in the document space in spatial correlation with the associated group of one or more primary content portions, wherein positioning the tertiary content portion in the document space in spatial correlation with the associated group of one or more primary content portions comprises:
(a) making a determination of whether sufficient space exists in the document space to position the tertiary content portion in spatial correlation with the associated group of one or more primary content portions,
(b) if the determination is that sufficient space exists, then positioning the tertiary content portion in spatial correlation with the associated group of one or more primary content portions, and
(c) if the determination is that that insufficient space exists, (i) identifying, in the document space, a given secondary content portion that has a lower priority than the tertiary content portion, (ii) removing the given secondary content portion from the document space, and (iii) then repeating from (a).

8. The method of claim 7, wherein identifying the given secondary content portion that has a lower priority than the given tertiary content portion comprises:
identifying a plurality of secondary content portions that each have a lower priority than the given tertiary content portion; and
selecting as the given secondary content portion a secondary content portion of the identified plurality that has a lowest priority of the identified plurality of secondary content portions,
and wherein the method further comprises outputting the document for viewing by a user.

9. A computerized method of dynamically laying out a document in a document space defined in computer memory, to facilitate subsequent output of the document for viewing by a user, the method comprising, in order, the steps of:
(a) a computer positioning one or more primary content portions in the document space, wherein the document space defines one or more document regions, and wherein each of the one or more primary content portions is thereby positioned in a region of the one or more regions;
(b) for one or more secondary content portions each associated respectively with a given primary content portion positioned in a region of the document space and each having an associated priority, the computer carrying out the following functions with respect to each secondary content portion taken in priority order:
(i) positioning the secondary content portion in the region in a manner that spatially correlates the secondary content portion with the associated primary content portion, if space in the region permits, and
(ii) if space in the region does not permit, then discontinuing positioning of the secondary content portion;
(c) for each of one or more tertiary content portions that is associated with a given one of the one or more regions and that has an associated priority, the computer carrying out functions comprising:
(i) making a determination of whether space in the given region permits positioning the tertiary content portion in the given region,
(ii) if the determination is that space in the region permits, then positioning the tertiary content portion anywhere in the given region and
(iii) if the determination is that space in the region does not permit, then identifying, in the given region, a given secondary content portion with a priority lower than the tertiary content portion, removing the given secondary content portion, and repeating from step (c)(i).

10. The method of claim 9, wherein positioning the secondary content portion in the region in a manner that spatially correlates the secondary content portion with the associated primary content portion comprises:
positioning the secondary content portion in the region in a position adjacent to the associated primary content portion, and positioning in the region an arrow that points from the secondary content portion to the associated primary content portion,
whereby the arrow in the output document provides a visual indication of the association between the secondary content portion and the associated primary content portion.

11. The method of claim 9, further comprising:
for each of the one or more tertiary content portions, if space in the region does not permit positioning the tertiary content portion anywhere in the region, then:
identifying a plurality of secondary content portions already positioned in the region and each having a priority lower than the tertiary content portion; and
selecting as the given secondary content portion a secondary content portion of the identified plurality that has the lowest priority of the identified plurality of secondary content portions.

12. The method of claim 9, further comprising:
dynamically generating or customizing at least one of the one or more secondary content portions based on at least one of the one or more primary content portions.

13. The method of claim 9, further comprising:
outputting the document for viewing by a user.

14. The method of claim 13, wherein outputting the document for viewing by a user comprises outputting the document on presentation means selected from the group consisting of (i) a computer display screen and (ii) paper.

15. The method of claim 9, further comprising carrying out (a), (b), and (c) respectively for each of a plurality of unique sets of primary, secondary, and tertiary content portions, thereby resulting in uniquely laying out respectively each of a plurality of documents.

16. The method of claim 15, further comprising:
outputting each of the plurality of documents for user-viewing.

17. The method of claim 9, wherein the document represents a telecommunication service invoice.

18. A computerized method of generating invoices for telecommunication service, comprising, respectively for each of a plurality of service accounts, in order:
(a) a computer virtually positioning primary invoice data in a document space defined in computer memory;
(b) the computer identifying secondary invoice data associated with the virtually-positioned primary invoice data;
(c) the computer making a first determination of whether space permits to virtually position the identified secondary invoice data in the document space in a manner that spatially correlates the secondary invoice data with the associated primary invoice data, and (i) if the first determination is yes, then virtually positioning the identified secondary invoice data in the document space in the manner that spatially correlates the secondary invoice data with the associated primary invoice data, but (ii) if the first determination is no, then declining to position the identified secondary invoice data in the document space;
(d) the computer identifying tertiary invoice data associated with the virtually-positioned primary invoice data;
(e) the computer making a second determination of whether space permits to virtually position the identified tertiary invoice data in the document space, and (i) if the second determination is yes, then virtually positioning the identified tertiary invoice data in the document space, but (ii) if the second determination is no, then identifying a lower priority piece of secondary invoice data that has already been positioned in the document space, removing the lower priority piece of secondary invoice data from the document space, and repeating step e; and
(f) the computer outputting an invoice corresponding to the document space, for viewing by a user.

* * * * *